(12) United States Patent
Zhan et al.

(10) Patent No.: US 10,551,545 B2
(45) Date of Patent: Feb. 4, 2020

(54) LIGHT GUIDE PLATE, BACKLIGHT MODULE AND DISPLAY APPARATUS

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Jianghui Zhan, Beijing (CN); Chang Lv, Beijing (CN); Jiang Zhu, Beijing (CN); Hongchao He, Beijing (CN); Liangliang Zheng, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/772,809

(22) PCT Filed: Aug. 16, 2017

(86) PCT No.: PCT/CN2017/097650
§ 371 (c)(1),
(2) Date: May 1, 2018

(87) PCT Pub. No.: WO2018/137333
PCT Pub. Date: Aug. 2, 2018

(65) Prior Publication Data
US 2019/0278014 A1    Sep. 12, 2019

(30) Foreign Application Priority Data

Jan. 24, 2017 (CN) .......................... 2017 1 0060284

(51) Int. Cl.
*F21V 21/00*    (2006.01)
*F21V 8/00*    (2006.01)

(52) U.S. Cl.
CPC ......... *G02B 6/0036* (2013.01); *G02B 6/0038* (2013.01); *G02B 6/0061* (2013.01)

(58) Field of Classification Search
CPC ... G02B 6/0036; G02B 6/0038; G02B 6/0061
(Continued)

(56) References Cited

U.S. PATENT DOCUMENTS 7,950,838 B2 * 5/2011 Johnson ................. G02B 5/045
    349/112
7,967,489 B2 * 6/2011 Kim ...................... G02B 6/0053
    362/606
(Continued)

FOREIGN PATENT DOCUMENTS

CN    101051149 A    10/2007
CN    201266245 Y    7/2009
(Continued)

OTHER PUBLICATIONS

International Search Report and Written Opinion from PCT Application Serial No. PCT/CN2017/097650, dated Nov. 15, 2017, 23 pages.
(Continued)

*Primary Examiner* — Laura K Tso
(74) *Attorney, Agent, or Firm* — Kinney & Lange, P.A.

(57) ABSTRACT

Embodiments of the present invention provide a light guide plate, a backlight module and a display apparatus. The light guide plate includes: a light guide plate body, and a prism structure disposed on a light exit face of the light guide plate body and including a plurality of prisms. The plurality of prisms each have a top farthest from the light exit face of the light guide plate body. A height difference is formed between
(Continued)

the tops of the plurality of prisms, and/or the top of at least one of the plurality of prisms has a portion with a part farthest from the light exit face of the light guide plate body, and a height difference is formed between the part and the top of the at least one of the plurality of prisms.

15 Claims, 4 Drawing Sheets

(58) Field of Classification Search
USPC .......................................................... 362/620
See application file for complete search history.

(56) References Cited

U.S. PATENT DOCUMENTS

| | | | | |
|---|---|---|---|---|
| 8,692,464 | B2* | 4/2014 | Wang | G02B 6/0038 |
| | | | | 313/606 |
| 8,942,522 | B2* | 1/2015 | Edmonds | G02B 5/045 |
| | | | | 385/31 |
| 9,164,220 | B2* | 10/2015 | Hunt | G02B 5/045 |
| 10,234,607 | B1* | 3/2019 | Chu | G02B 5/045 |
| 2009/0161387 | A1* | 6/2009 | Su | G02B 6/0038 |
| | | | | 362/620 |
| 2010/0123854 | A1* | 5/2010 | Adachi | F21V 7/04 |
| | | | | 349/61 |
| 2011/0267694 | A1 | 11/2011 | Shiau et al. | |
| 2012/0068596 | A1 | 3/2012 | Inoue et al. | |
| 2014/0063414 | A1 | 3/2014 | Kim et al. | |
| 2014/0071549 | A1 | 3/2014 | Yang et al. | |

FOREIGN PATENT DOCUMENTS

| | | |
|---|---|---|
| CN | 201302611 Y | 9/2009 |
| CN | 201475879 U | 5/2010 |
| CN | 102236122 A | 11/2011 |
| CN | 102338344 A | 2/2012 |
| CN | 102455449 A | 5/2012 |
| CN | 101351728 A | 9/2012 |
| CN | 103630954 A | 3/2014 |
| CN | 103676311 A | 3/2014 |
| CN | 104678466 A | 6/2015 |
| CN | 106547047 A | 3/2017 |
| KR | 20090054325 A | 5/2009 |

OTHER PUBLICATIONS

First Chinese Office Application dated Sep. 25, 2018, received for corresponding Chinese Application No. 201710060284.7.

* cited by examiner

Fig. 11

LIGHT GUIDE PLATE, BACKLIGHT MODULE AND DISPLAY APPARATUS

CROSS-REFERENCE TO RELATED APPLICATION

This application is a Section 371 National Stage Application of International Application No. PCT/CN2017/097650, filed on 16 Aug. 2017, entitled "LIGHT GUIDE PLATE, BACKLIGHT MODULE AND DISPLAY APPARATUS", which has not yet published, which claims priority to Chinese Application No. 201710060284.7, filed on 24 Jan. 2017, incorporated herein by reference in their entirety.

BACKGROUND

1. Technical Field

Embodiments of the present invention relate to a light guide plate, a backlight module and a display apparatus.

2. Description of the Related Art

Figure 1:
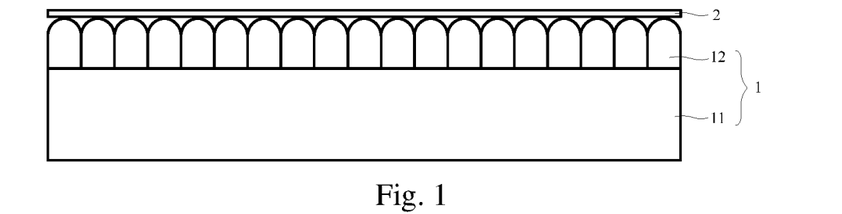
FIG. 1 is a schematic view showing a configuration of cooperation between a conventional light guide plate and an optical film.

In order to improve a backlight effect, generally a surface microstructure is disposed on a light exit face of a light guide plate. As shown in FIG. 1, the light guide plate 1 comprises a light guide plate body 11 and a prism structure 12 disposed on a light exit side of the light guide plate body 11. An optical film 2 such as a diffusion sheet and the likes is disposed on a side of the prism structure 12. The prism structure 12 is a plurality of prisms having the same height and distributed uniformly.

However, in actual use, the optical film 2 is prone to adhere to the prism structure 12 of the light guide plate 1, so that poor display phenomena such as rainbow fringe, shadow and the like occur.

SUMMARY

Embodiments of the present invention provide a light guide plate comprising:

a light guide plate body, and a prism structure disposed on a light exit face of the light guide plate body and comprising a plurality of prisms, the plurality of prisms each having a top farthest from the light exit face of the light guide plate body, wherein a height difference is formed between the tops of the plurality of prisms, and/or the top of at least one of the plurality of prisms has a portion with a part farthest from the light exit face of the light guide plate body, and a height difference is formed between the part and the top of the at least one of the plurality of prisms.

According to embodiments of the present invention, the tops of at least some of the plurality of prisms are each provided with a protrusion serving as the portion, and the height difference is formed between a top of the protrusion and the top of the prism provided with the protrusion.

According to embodiments of the present invention, the top of each of the plurality of prisms is provided with at least two protrusions.

According to embodiments of the present invention, the at least two protrusions on each of the plurality of prisms are uniformly distributed in a direction in which the each of the plurality of prisms extends.

According to embodiments of the present invention, the protrusions on two adjacent ones of the plurality of prisms are staggered from one another.

According to embodiments of the present invention, the prism structure comprises a plurality of first prisms and a plurality of second prisms, wherein:

each of the plurality of first prisms has a greater height than each of the plurality of second prisms; and the protrusions are disposed on tops of at least some of the plurality of first prisms.

According to embodiments of the present invention, the tops of at least some of the plurality of prisms are each formed with a recess serving as the portion, and the height difference is formed between a bottom of the recess and the top of the prism formed with the recess.

According to embodiments of the present invention, the prism structure comprises a plurality of first prisms and a plurality of second prisms, and the height difference is formed between each of the plurality of first prisms and each of the plurality of second prisms.

According to embodiments of the present invention, the plurality of first prisms and the plurality of second prisms are alternately arranged.

According to embodiments of the present invention, the plurality of prisms are disposed in parallel with one another.

According to embodiments of the present invention, the plurality of prisms extend in a direction parallel to one side of the light guide plate body.

According to embodiments of the present invention, the recess passes through the prism in a direction intersecting the prism.

In addition, embodiments of the present invention further provide a backlight module comprising any one of the abovementioned light guide plates.

Embodiments of the present invention also provide a display apparatus comprising the abovementioned backlight module.

DETAILED DESCRIPTION OF THE EMBODIMENTS

A clear and complete description of technical solutions in embodiments of the present invention will be made as below in conjunction with the accompanying drawings in the embodiments of the present invention. Apparently, the described embodiments are some of the embodiments of the present invention rather than all of the embodiments of the present invention. All other embodiments derived by those skilled in the art based on the embodiments of the present invention without making a creative work shall fall within the protection scope of the present invention.

Embodiments of the present invention provide a light guide plate, a backlight module and a display apparatus. The display apparatus comprises the backlight module, and the backlight module comprises the light guide plate and a light source. The light guide plate solves, by a height difference formed between tops of a prism structure of the light guide plate, the problem that poor phenomena such as rainbow fringe, shadow and the like occur because the optical film is prone to adhere to the prism structure of the light guide plate.

Referring to FIG. 2, FIG. 7, FIG. 8, and FIG. 9, the light guide plate 100 according to an embodiment of the present invention comprises: a light guide plate body 111, and a prism structure 112 disposed on a light exit face of the light guide plate body 111 and comprising a plurality of prisms. A height difference h is formed between tops of the prism structure 112. For example, each prism has a top farthest from the light exit face of the light guide plate body 111. A height difference h is formed between the tops of the plurality of prisms, and/or the top of at least one of the plurality of prisms has a portion with a part farthest from the light exit face of the light guide plate body 111, and a height difference h is formed between the part and the top of the at least one of the plurality of prisms.

Figure 2:
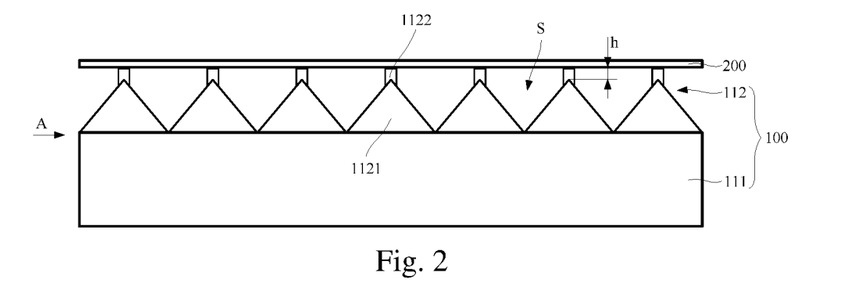
FIG. 2 is a schematic view showing a configuration of cooperation between a light guide plate according to an embodiment of the present invention and an optical film.
Figure 3:
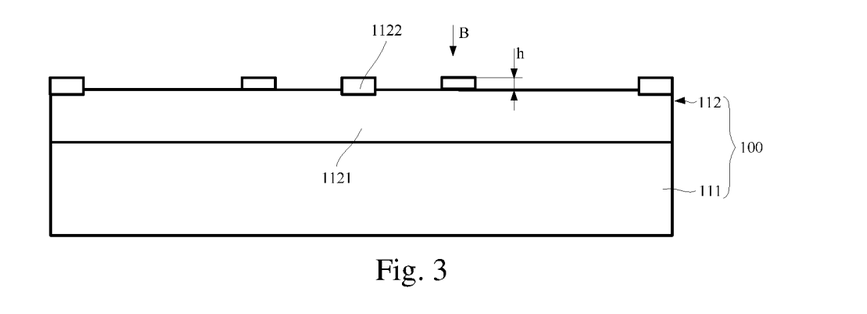
FIG. 3 is a schematic view showing a structure of the light guide plate when viewed from the direction A shown in FIG. 2.

As shown in the configurations of FIG. 2 to FIG. 3, the light guide plate 100 comprises: a light guide plate body 111, and a prism structure 112 disposed on a light exit face of the light guide plate body 111 and comprising a plurality of prisms 1121 parallel to one another. A top of the prism structure 112 is provided with protrusions 1122 serving as the portions, so that a height difference h is formed between tops of the protrusions 1122 and tops of the prisms 1121. An optical film 200 is disposed on the tops of the protrusions 1122.

Figure 5:
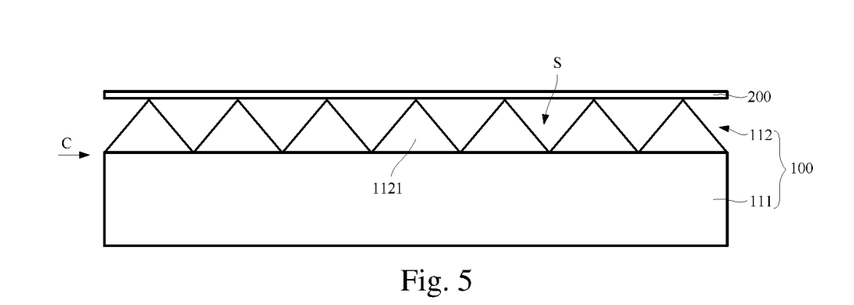
FIG. 5 is a schematic view showing a configuration of cooperation between a light guide plate according to an embodiment of the present invention and an optical film.
Figure 6:
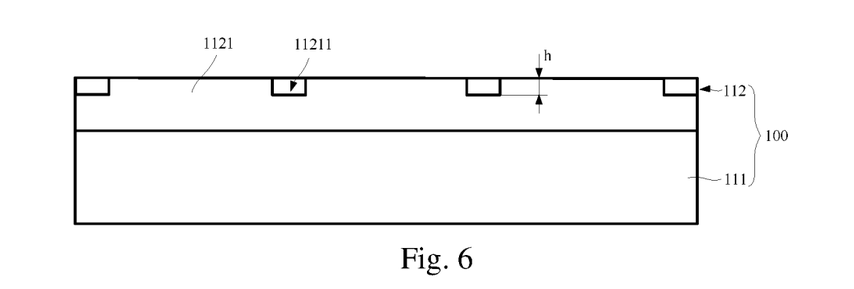
FIG. 6 is a schematic view showing a structure of the light guide plate when viewed from the direction C shown in FIG. 5.

Referring also to FIG. 5 and FIG. 6, the light guide plate 100 comprises: a light guide plate body 111, and a prism structure 112 disposed on a light exit face of the light guide plate body 111 and comprising a plurality of prisms 1121 parallel to one another. A top of the prism structure 112 is formed with four recesses 11211 serving as the portions, so that a height difference h is formed between tops of the prisms 1121 and bottoms of the recesses 11211. The recess 11211 may pass through the prism 1121 in a direction intersecting the prism (for example in a direction perpendicular to the prism). Gaps S between the prisms 1121 are in communication with one another through the four recesses 11211 formed in the top of the prism 1121, thereby preventing an optical film 200 from being adsorbed on the tops of the prisms 1121. The optical film 200 is disposed on the tops of the prisms 1121.

Figure 7:
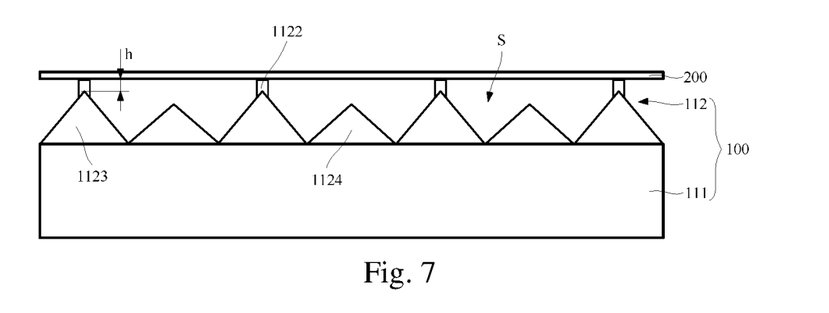
FIG. 7 is a schematic view showing a configuration of cooperation between a light guide plate according to an embodiment of the present invention and an optical film.

As shown in a configuration of FIG. 7, the light guide plate 100 comprises: a light guide plate body 111, and a prism structure 112 disposed on a light exit face of the light guide plate body 111. The prism structure 112 comprises a plurality of first prisms 1123 and a plurality of second prisms 1124. Each of the plurality of first prisms 1123 has a greater height than each of the plurality of second prisms 1124, and tops of some of the first prisms 1123 are provided with protrusions 1122. A height difference h is formed between the tops of the first prisms 1123 and the tops of the protrusions 1122 by the protrusions 1122 disposed on the tops of the first prisms 1123. Since the height of the first prisms 1123 is greater than the height of the second prisms 1124 and the protrusions 1122 are disposed on the tops of the first prisms 1123, the optical film 200 is supported on the protrusions 1122 disposed on the tops of the first prisms 1123 when the optical film 200 is mounted to the light exit face of the light guide plate 100. A gap S between the optical film 200 and the light guide plate 100 is increased by providing the protrusions 1122, so that the optical film 200 can be prevented from adhering to the light guide plate 100.

Figure 8:
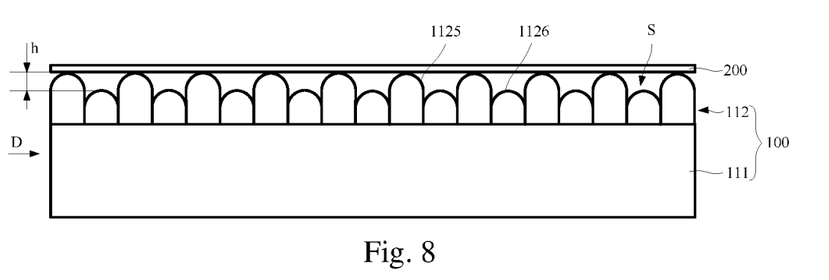
FIG. 8 is a schematic view showing a configuration of cooperation between a light guide plate according to another embodiment of the present invention and an optical film.
Figure 9:
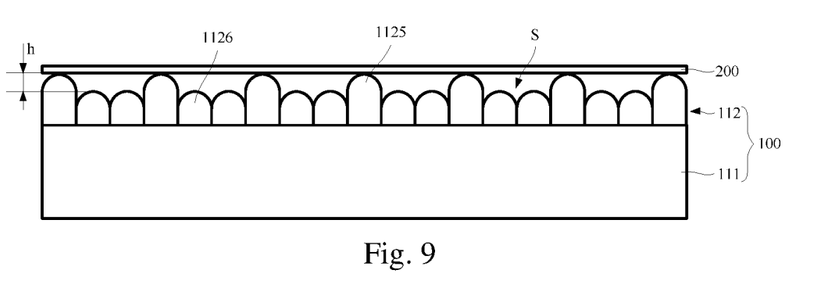
FIG. 9 is a schematic view showing a configuration of cooperation between a light guide plate according to a further embodiment of the present invention and an optical film.

As shown in configurations of FIG. 8 and FIG. 9, the light guide plate 100 comprises: a light guide plate body 111, and a prism structure 112 disposed on a light exit face of the light guide plate body 111. The prism structure 112 comprises a plurality of first prisms 1125 and a plurality of second prisms 1126. The first prisms 1125 have a greater height than the second prisms 1126, so that a height difference h is formed between the first prisms 1125 and the second prisms 1126. The optical film 200 is disposed on the tops of the first prisms 1125. The first prisms 1125 and the second prisms 1126 may be arranged alternately in sequence as shown in the configuration of FIG. 8, or the first prisms 1125 and the second prisms 1126 may also be arranged in such a way that two second prisms 1126 arranged in parallel with each other are arranged between adjacent first prisms 1125 as shown in the configuration of FIG. 9. Further, the arrangements of the first prisms 1125 and the second prisms 1126 are not limited to those shown in FIG. 8 and FIG. 9, and the first prisms 1125 and the second prisms 1126 may also be arranged in other manners.

The prism structure 112 constituted by the plurality of prisms is disposed on the light exit face of the light guide plate 100. The prism structure 112 as shown in the configuration of FIG. 2 comprises the plurality of prisms 1121, and the prism structure 112 as shown in the configurations of FIG. 8 and FIG. 9 comprises the plurality of first prisms 1125 and the plurality of second prisms 1126. The height difference h is formed between tops of the prism structure 112. As shown in the configurations of FIG. 2 and FIG. 3, the height difference h is formed between the prisms 1121 and the protrusions 1122 disposed on the tops of the prisms 1121, and as shown in the configurations of FIG. 8 and FIG. 9, the height difference h is formed between the first prisms 1125 and the second prisms 1126 due to different heights of the first prisms 1125 and the second prisms 1126. Therefore, an enlarged gap S is formed between the optical film 200 and the light guide plate 100 when the optical film 200 is disposed on a top of the light guide plate 100. As a result, atmospheric pressures on both sides of the optical film 200 are equal to each other, to prevent occurrence of vacuum adsorption between the optical film 200 and the light guide plate 100 and to decrease a probability of adsorption of the optical film 200 onto the light guide plate 100, thereby solving the problem that poor display phenomena such as rainbow fringe, shadow and the like occur because the optical film 200 is prone to adhere to the prism structure 112 of the light guide plate 100.

Hence, the light guide plate 100 can solve the problem that poor phenomena such as rainbow fringe, shadow and the like occur because the optical film 200 is prone to adhere to the prism structure 112 of the light guide plate 100.

According to the above different manners in which the height difference h is formed, the light guide plate 100 may be implemented in at least two manners to be described as below.

A first implementation manner of the light guide plate will now be described. As shown in configurations of FIG. 2, FIG. 3 and FIG. 4, tops of at least some of a plurality of prisms 1121 are each provided with a protrusion 1122 serving as the portion, and a height difference h is formed between a top of the protrusion 1122 and the top of the prism 1121 provided with the protrusion 1122. As shown in the configuration of FIG. 2, a top of each prism 1121 is provided with a protrusion 1122, and a height difference h is formed between tops of the protrusions 1122 and the tops of the prisms 1121, so that an enlarged gap S is formed between the optical film 200 and the light guide plate 100. As a result, atmospheric pressures on one side of the optical film 200 facing forwards the light guide plate 100 and on the other side of the optical film 200 facing away from the light guide plate 100 are equal to each other, to prevent occurrence of vacuum adsorption of the optical film 200 onto the light guide plate 100 due to an excessively small gap between them.

Figure 4:
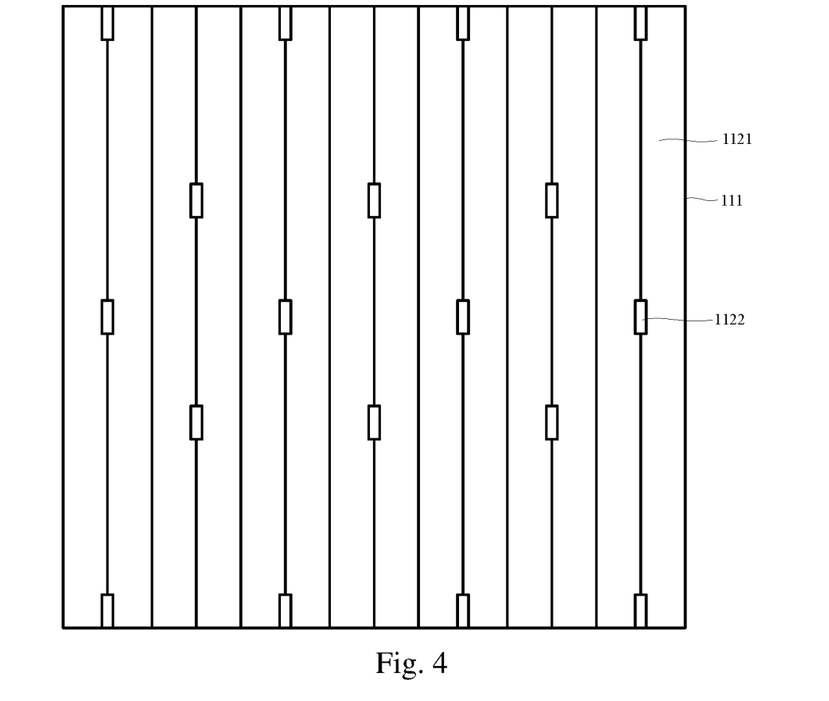
FIG. 4 is a schematic view showing the structure of the light guide plate when viewed from the direction B shown in FIG. 3.

Of course, the protrusions 1122 are disposed on the top of each of the plurality of prisms 1121 shown in FIG. 2 and FIG. 4, but the protrusions 1122 may also be disposed on the tops of some of the plurality of prisms 1121 according to actual conditions so long as the optical film 200 is disposed smoothly on the top of the light guide plate 100. In addition, a shape of a top surface of the protrusion 1122 is not limited to a rectangle shape shown in the configuration of FIG. 4, and may also be any shape which can support the optical film 200, such as a square shape, a circular shape, a triangular shape, an elliptical shape, a trapezoidal shape, and the like.

In order to simplify a manufacturing process, and to reduce a manufacturing cost, the protrusions 1122 and the prisms 1121 may also be integrally formed, or the prisms 1121 and the protrusions 1122 may also be integrally formed while the light guide plate 100 is molded.

Specifically, as shown in the configuration of FIG. 4, the top of each of the plurality of prisms 1121 is provided with at least two protrusions 1122. As shown in the configuration of FIG. 4, tops of some of the prisms 1121 are each provided with two protrusions 1122, and tops of others of the prisms 1121 are each provided with three protrusions 1122. In a specific implementation, a top of each prism 1121 may also be provided with four, five or even more protrusions 1122, and quantity of the protrusions on each prism is not limited to that of the protrusions 1122 disposed on each prism 1121 as shown in the configuration of FIG. 4. When the top of each prism 1121 is provided with a plurality of protrusions 1122, the plurality of protrusions 1122 may be distributed uniformly or randomly in a direction in which the prism 1121 extends so long as the optical film 200 can be smoothly supported by the protrusions 1122 disposed on the tops of prisms 1121.

Furthermore, at least two protrusions 1122 are uniformly distributed on each prism 1121 in a direction in which the each prism 1121 extends. As shown in the configuration of FIG. 4, whether the tops of the prisms 1121 are each provided with two or three protrusions 1122, the protrusions 1122 are uniformly distributed in the direction in which the prism 1121 extends.

When at least two protrusions 1122 disposed on the top of each prism 1121 are uniformly distributed in the direction in which the prism 1121 extends, the light guide plate 100 can uniformly support the optical film 200 through the uniformly distributed protrusions 1122. As a result, supported points of the optical film 200 can receive uniform forces while the optical film 200 is smoothly supported, thereby reducing damage of the optical film 200 caused by stress concentration generated due to received nonuniform forces. Therefore, service life of the optical film 200 can be prolonged.

In order that the light guide plate 100 and the optical film 200 each receive more uniform forces, as shown in the configuration of FIG. 4, the protrusions 1122 on two adjacent ones of the plurality of prisms 1121 are staggered from one another.

Based on the first implementation manner, referring to FIG. 7, the prism structure 112 comprises a plurality of first prisms 1123 and a plurality of second prisms 1124. The prism structure 112 as shown in the configuration of FIG. 7 comprises the plurality of first prisms 1123 and the plurality of second prisms 1124 which are alternately arranged.

Each of the plurality of first prisms 1123 has a greater height than each of the plurality of second prisms 1124.

The protrusions 1122 are disposed on tops of at least some of the plurality of first prisms 1123. The protrusions 1122 are disposed on the top of each of the plurality of first prisms 1123 as shown in the configuration of FIG. 7.

Since the height of the first prisms 1123 is greater than the height of the second prisms 1124 and the protrusions 1122 are disposed on the tops of the first prisms 1123, a height difference h1 is formed between the tops of the first prisms 1123 and the tops of the protrusions 1122, a height difference h2 is formed between the first prisms 1123 and the second prisms 1124, and a height difference h (h=h1+h2) is formed between the tops of the second prisms 1124 and the tops of the protrusions 1122, as shown in FIG. 7. Therefore, the optical film 200 is supported on the protrusions 1122 disposed on the tops of the first prisms 1123 when the optical film 200 is mounted to the light exit face of the light guide plate 100. A gap S between the optical film 200 and the light guide plate 100 is increased by providing the protrusions 1122, so that the optical film 200 can be further prevented from adhering to the light guide plate 100, and further solves the problem that poor display phenomena such as rainbow fringe, shadow and the like occur because the optical film 200 is prone to adhere to the prism structure 112 of the light guide plate 100.

In the prism structure 112 of the above light guide plate 100, the first prisms 1123 and the second prisms 1124 may be arranged alternately as shown in the configuration of FIG. 7, or the first prisms 1123 and the second prisms 1124 may also be arranged in other manners to satisfy operating requirements of the light guide plate 100, and the arrangement manner of the first prisms 1123 and the second prisms 1124 is not limited to that shown in the configuration of FIG. 7. Likewise, quantity of the protrusion(s) 1122 disposed on the top of each first prism 1123 may be arbitrary quantity, such as one, two, three, four or the like, as long as the operating requirements are satisfied. the protrusions 1122 may be distributed uniformly or randomly in a direction in which the first prism 1123 extends, and the top of each first prism 1123 may be provided with the protrusions 1122, or the tops of some of the first prisms 1123 may also be selectively provided with the protrusions 1122 so long as quantity of the protrusions 1122 can satisfy requirements for supporting the optical film 200.

A second implementation manner of the light guide plate will now be described. As shown in configurations of FIG. 5 and FIG. 6, tops of at least some of a plurality of prisms 1121 of the light guide plate 100 are each formed with a recess 11211 serving as the portion, and a height difference h is formed between a bottom of the recess 11211 and the top of the prism 1121 formed with the recess 11211. The recess 11211 may pass through the prism 1121 in a direction intersecting the prism (for example in a direction perpendicular to the prism).

The height difference h is formed between tops of the prism structure 112 by four recesses 11211 formed in the top of the prism 1121. Gaps S between the prisms 1121 are in communication with one another through the four recesses 11211 formed in the top of the prism 1121, thereby preventing an optical film 200 from being adsorbed on the tops of the prisms 1121. The optical film 200 is disposed on the tops of the prisms 1121.

Based on the second implementation manner, in the light guide plate 100 shown in configurations of FIG. 5 and FIG. 6, the top of each prism 1121 may be formed with the recesses 11211, or the tops of some of the prisms 1121 may also be each formed with the recesses 11211. Quantity of the recesses 11211 formed in the top of each prism 1121 is not limited to four as shown in the figures, and may be set to be three, five, six or even more according to actual requirements, and the plurality of recesses 11211 may be distributed uniformly or randomly in a direction in which the prism 1121 extends.

Figure 10:
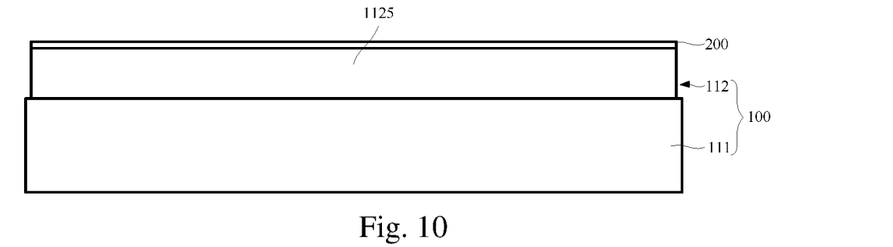
FIG. 10 is a schematic view showing a configuration of the cooperation between the light guide plate and the optical film shown in FIG. 8 when viewed from the direction D shown in FIG. 8.

A third implementation manner of the light guide plate will now be described. Referring to FIG. 8, FIG. 9, and FIG. 10, a prism structure 112 comprises a plurality of first prisms 1125 and a plurality of second prisms 1126, and a height difference h is formed between each of the plurality of first prisms 1125 and each of the plurality of second prisms 1126. As shown in configurations of FIG. 8 and FIG. 9, a prism structure 112 comprises a plurality of first prisms 1125 having a same height, and second prisms 1126 having a same height, and there is a height difference h between the first prism 1125 and the second prism 1126.

Since the prism structure 112 comprises the first prisms 1125 and the second prisms 1126 having a different height from the first prisms 1125, the height difference is formed between the first prism 1125 and the second prism 1126. Furthermore, when the optical film 200 is mounted to the prism structure 112 at the top of the light guide plate 100, the optical film 200 is mounted to the tops of the first prisms 1125 since the height of the first prisms 1125 is greater, so that an enlarged gap S is formed between the optical film 200 and the second prisms 1126. Under the action of the gap S, atmospheric pressures on one side of the optical film 200 facing forwards the light guide plate 100 and on the other side of the optical film 200 facing away from the light guide plate 100 are equal to each other, to prevent occurrence of vacuum adsorption between the optical film 200 and the light guide plate 100 due to an excessively small gap S between them, thereby solving the problem that poor display phenomena such as rainbow fringe, shadow and the like occur because the optical film 200 is prone to adhere to the prism structure 112 of the light guide plate 100.

Likewise, in order to improve uniformity of forces received by the optical film 200 and stability of supporting the optical film 200, as shown in the configuration of FIG. 8, the plurality of first prisms 1125 and the plurality of second prisms 1126 are alternately arranged. Of course, the first prisms 1125 and the second prisms 1126 may also be arranged in such a way that two second prisms 1126 are arranged side by side between every two adjacent first prisms 1125 as shown in the configuration of FIG. 9. In this case, an enlarged gap S can be formed between the optical film 200 and the light guide plate 100, and a probability of occurrence of adsorption of the optical film 200 onto the light guide plate 100 can be further decreased, thereby solving the problem that poor display phenomena such as rainbow fringe, shadow and the like occur because the optical film 200 is prone to adhere to the prism structure 112 of the light guide plate 100.

However, arrangements of the first prisms 1125 and the second prisms 1126 are not limited to those shown in FIG. 8 and FIG. 9, and may also be set according to actual conditions in the case where operating requirements are satisfied, and are no longer listed one by one herein.

Specifically, as shown in the configuration of FIG. 2, the plurality of prisms 1121 are disposed in parallel with one another; and as shown in the configurations of FIG. 8 and FIG. 9, the first prisms 1125 and the second prisms 1126 are arranged in parallel with one another. Likewise, the first prisms 1125 and the second prisms 1126 may also be formed integrally with the light guide plate body 111. In other words, the first prisms 1125 and the second prisms 1126 are molded integrally on a light exit face of the light guide plate body 111 while the light guide plate 100 is molded, thereby enhancing a structural strength of the light guide plate 100 while production efficiency is increased.

Furthermore, as shown in the configuration of FIG. 2, the plurality of prisms 1121 extend in a direction parallel to one side of the light guide plate body 111. As shown in the configurations of FIG. 8 and FIG. 9, the first prisms 1125 and the second prisms 1126 each extend in a direction parallel to one side of the light guide plate body 111.

Figure 11:
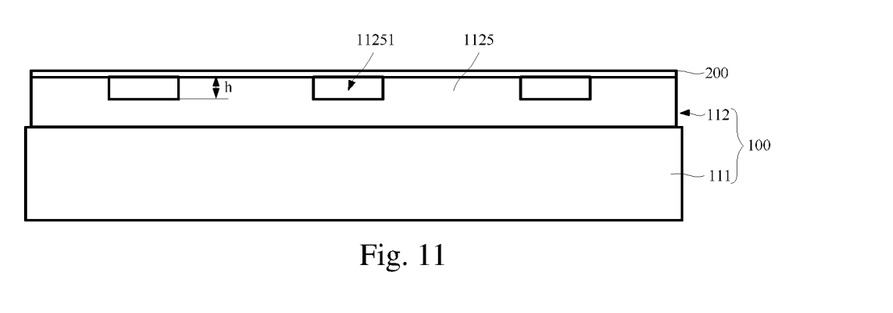
FIG. 11 is a schematic view showing another configuration of the cooperation between the light guide plate and the optical film shown in FIG. 8 when viewed from the direction D shown in FIG. 8.

Based on the various embodiments of the light guide plate 100 in the above third implementation manner, as shown in the configuration of FIG. 11, tops of the first prisms 1125 may also be each formed with a plurality of recesses 11251 serving as the portion, and the recess 11251 may pass through the prism 1125 in a direction intersecting the prism (for example in a direction perpendicular to the prism). Gaps S formed between the first prisms 1125 can be in communication with one another through the plurality of recesses 11251, so that a possibility of adherence of the optical film 200 to the light guide plate 100 is further decreased, thereby solving the problem that poor display phenomena such as rainbow fringe, shadow and the like occur because the optical film 200 is prone to adhere to the prism structure 112 of the light guide plate 100.

Based on the above various embodiments, a cross section of the prism 1121 may have a triangular shape shown in the configuration of FIG. 2, or may also have an arch shape shown in the configuration of FIG. 8. In addition, the shape of the cross section of the prism 1121 is not limited to those shown in the above figures, and the cross section of the prism 1121 may have any other shape such as a semicircular shape, an arc shape, a circular shape, a rectangle shape, a radial shape, and the like so long as uniformity and luminance of a light exiting from the light guide plate 100 can be increased to improve displaying effect of the display apparatus.

In addition, the light guide plate 100 may comprise both the protrusions 1122 and the recesses 11211, 11251.

In addition, embodiments of the present invention also provide a backlight module comprising any one of the light guide plates 100 according to the above embodiments.

Embodiments of the present invention further provide a display apparatus comprising the backlight module according to the above embodiments. The display apparatus may be a liquid crystal display (LCD).

The prism structure constituted by the plurality of prisms is disposed on the light exit face of the light guide plate. There is the height difference between the tops of the prism structure. Therefore, there is an enlarged gap between the optical film and the light guide plate when the optical film is disposed on the light guide plate. As a result, atmospheric pressures on both sides of the optical film are equal to each other, to prevent occurrence of vacuum adsorption between the optical film and the light guide plate and to decrease a probability of adsorption of the optical film onto the light guide plate, thereby solving the problem that poor display phenomena such as rainbow fringe, shadow and the like occur because the optical film is prone to adhere to the prism structure of the light guide plate.

Hence, the light guide plate can solve the problem that poor phenomena such as rainbow fringe, shadow and the like occur because the optical film is prone to adhere to the prism structure of the light guide plate.

Apparently, various changes and modifications to the embodiments of the present invention may be made by those skilled in the art without departing from the spirit and scope of the present invention. Therefore, if these amendments and modifications to the present invention belong to the scope defined in the appended claims of the present invention and their equivalents, the present invention is intended to include the changes and modifications.

What is claimed is:

1. A backlight module comprising:
    a light source configured to emit a light;
    a light guide plate configured such that the light emitted by the light source enters the light guide plate, and comprising: a light guide plate body, and a prism structure disposed on a light exit face of the light guide plate body and comprising a plurality of prisms, the plurality of prisms each having a top farthest from the light exit face of the light guide plate body; and
    an optical film disposed on a light exit side of the light guide plate,
    wherein the top of at least one of the plurality of prisms has at least one of a protrusion having a top between which and the top of the at least one of the plurality of prisms a height difference is formed, or a recess having a bottom between which and the top of the at least one of the plurality of prisms a height difference is formed, such that atmospheric pressures on one side of the optical film facing forwards the light guide plate and on the other side of the optical film facing away from the light guide plate are equal to each other.

2. The backlight module of claim 1, wherein:
    the tops of at least some of the plurality of prisms are each provided with the protrusion.

3. The backlight module of claim 2, wherein:
    the top of each of the plurality of prisms is provided with at least two protrusions.

4. The backlight module of claim 3, wherein:
    the at least two protrusions on each of the plurality of prisms are uniformly distributed in a direction in which each of the plurality of prisms extends.

5. The backlight module of claim 4, wherein:
    the protrusions on two adjacent ones of the plurality of prisms are staggered from one another.

6. The backlight module of claim 2, wherein:
    the prism structure comprises a plurality of first prisms and a plurality of second prisms,
    each of the plurality of first prisms has a greater height than each of the plurality of second prisms, and
    the protrusions are disposed on tops of at least some of the plurality of first prisms.

7. The backlight module of claim 1, wherein:
    the tops of at least some of the plurality of prisms are each formed with the recess.

8. The backlight module of claim 1, wherein:
    the prism structure comprises a plurality of first prisms and a plurality of second prisms, and a height difference is formed between each of the plurality of first prisms and each of the plurality of second prisms.

9. The backlight module of claim 8, wherein:
    the plurality of first prisms and the plurality of second prisms are alternately arranged.

10. The backlight module of claim 1, wherein:
    the plurality of prisms are disposed in parallel with one another.

11. The backlight module of claim 1, wherein:
    the plurality of prisms extend in a direction parallel to one side of the light guide plate body.

12. The backlight module of claim 7, wherein:
    the recess passes through the prism in a direction intersecting the prism.

13. A display apparatus comprising:
    the backlight module according to claim 1.

14. The backlight module of claim 12, wherein:
    gaps between the prisms are in communication with one another through the recess.

15. The backlight module of claim 14, wherein:
    the recess has a flat bottom.

* * * * *